United States Patent

[11] 3,525,332

[72] Inventor Shinya Kosaka
 Tokyo, Japan
[21] Appl. No. 725,318
[22] Filed April 30, 1968
[45] Patented Aug. 25, 1970
[73] Assignee Olympus Optical Co., Ltd.
 Tokyo, Japan
 a Japanese corporation
[32] Priority Sept. 21, 1967
[33] Japan
[31] 42/80,170

[54] SHUTTER MECHANISM IN AN AUTOMATIC EXPOSURE CONTROL DEVICE OF AN ENDOSCOPE
3 Claims, 5 Drawing Figs.

[52] U.S. Cl. ............................................. 128/6,
 352/214
[51] Int. Cl. ............................................. A61b 1/06
[50] Field of Search .......................... 128/4, 5, 6,
 7, 8, 9, 10, 11; 95/11, 11.5, 64; 240/41.61, 46.11,
 46.21, 46.25, 46.29; 352/141, 208-212, 214

[56] References Cited

UNITED STATES PATENTS
2,867,209 1/1959 Foures et al. .............. 128/6
3,111,890 11/1963 Graves ..................... 95/64
3,446,128 5/1969 Dietz ....................... 95/10

*Primary Examiner*— Richard A. Gaudet
*Assistant Examiner*— Gerard F. Dunne
*Attorney*— Kurt Kelman ABSTRACT: An automatic exposure control device for an endoscope having a light conducting fiber optical system which receives a light from an external light source comprising a photo-diagnosing light passing plate member having a plurality of apertures therein and adapted to displace between a position in which a reduced intensity light may pass through and another position in which a high intensity light may pass through; a photographing light passing plate member having a larger hole therein and adapted to displace between a position in which a high intensity light may pass through and another position in which no light may pass through; and a control circuit adapted to electromagnetically displace said two plate members between said two positions, respectively, thereby to control the exposure of said endoscope.

Patented Aug. 25, 1970

3,525,332

INVENTOR

SHINYA KOSAKA

BY Kurt Kelman

AGENT

SHUTTER MECHANISM IN AN AUTOMATIC EXPOSURE CONTROL DEVICE OF AN ENDOSCOPE

BACKGROUND OF THE INVENTION

In order to take a photograph of a portion of the interior of a living body by an endoscope, it was the general practice that such a photographing was at all times performed under substantially constant conditions with the voltage of an external light source, the sensitivity of a film and the speed of a shutter maintained at predetermined values, respectively. Therefore, if there were variations in the distance between an object to be photographed and an objective lens, the intensity of the light from the external light source and/or the speed of the shutter, it was very difficult to obtain a proper quantity of light for photographing. In order to overcome the above-mentioned difficulty, an endoscope which incorporated a light conducting fiber optical system therein was proposed. Such an endoscope was designed to receive different quantities of light for photographing and photo-diagnosing respectively from separate external light sources. However, in such a conventional endoscope when a release button was abruptly depressed down so as to shift the endoscope from its photo-diagnosing position to the photographing position, there was the disadvantage that the photographing operation would commence while the afterglow of the light from the light source for photo-diagnosing was still present and the quantity of the light which was conducted to the light conduction face of the light conducting fiber optical system for photographing was still insufficient for photographing operation. And an endoscope which employed synchronization contacts instead of the conventional release button was also proposed. However, such an endoscope also had the disadvantage that the endoscope required the use of a delay circuit adapted to maintain the endoscope inoperative for photographing until the quantity of the light from the light source for photographing has reached a predetermined value and the endoscope could not commence the photographing operation rapidly.

SUMMARY OF THE INVENTION

The present invention relates to an automatic exposure control device for an endoscope and more particularly, to an automatic exposure control device for an endoscope of the type in which the endoscope can selectively photograph and photo-diagnosing a portion of the interior of a living body by the use of a light which is received by its associated light conducting fiber optical system from a common external light source.

One major object of the present invention is to provide a simple and economical automatic exposure control device for the above-mentioned type endoscope which can effectively eliminate the difficulties inherent in the conventional endoscopes.

Another object of the present invention is to provide an automatic exposure control device for the above-mentioned type endoscope which essentially comprises a shutter mechanism including a pair of blades which are electromagnetically driven by their separate relay devices, respectively.

According to the present invention, there is provided an endoscope having a light conducting fiber optical system which receives a light from an external light source and adapted to selectively photograph and photo-diagnosing a selected portion of the interior of a living body, characterized by an automatic exposure control device comprising a displaceable photo-diagnosing light passing plate member having a plurality of apertures therein and normally positioned on an optical axis extending between said light source and light conducting fiber optical system for allowing a light from said light source to pass through said apertures to the light conducting optical system by reducing the intensity of the light, said photo-diagnosing light passing plate member being adapted to retract from said optical axis upon electromagnetic driving thereof; a displaceable photographing light passing plate member having a single larger hole therein and normally positioned on said optical axis for allowing said light from said light source through said larger hole to said light conducting optical system while maintaining the light at a high intensity, said photographing light passing plate member being adapted to displace upon electromagnetic driving thereof so as to dispose the unholed portion thereof on said optical axis thereby to block the passage of said light to the light conducting optical system; and a control circuit including a timing circuit and adapted to electromagnetically drive said photo-diagnosing light passing plate member to retract the plate member away from said optical axis so as to allow said light from said light source through the hole to said light conducting optical system for photographing operation and after a predetermined exposure period energize said timing circuit to electromagnetically drive said photographing light passing plate member so as to dispose said unholed portion of the plate member on said optical axis thereby to terminate the light exposure period and upon the termination of the light exposure period return said photo-diagnosing light passing plate member and photographing light passing plate member to their normal positions ready for photo-diagnosing operation.

The above and other objects and attendant advantages of the present invention will be more readily apparent to those skilled in the art from the following description when read in connection with the accompanying drawing.

BRIEF DESCRIPTION OF THE DRAWING

The accompanying drawing schematically illustrates a preferred form of automatic exposure control device adapted to be employed in connection with an endoscope which incorporates a light conducting fiber optical system for receiving light from a common external light source for selective photographing and photo-diagnosing operations embodying the present invention in which.

PREFERRED EMBODIMENT OF THE INVENTION

Figure 1:
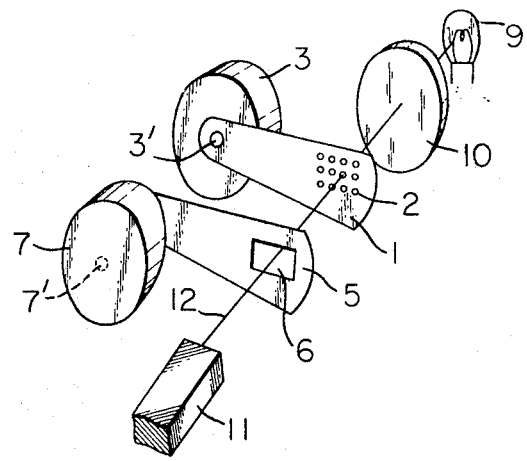
FIG. 1 is a fragmentary perspective view of the shutter mechanism of said automatic exposure control device.

The present invention will be now in detail described referring to the accompanying drawing in which a preferred form of automatic exposure control device according to the present invention is schematically shown by way of illustration, but not for limiting the scope of the invention.

The novel automatic exposure control device is adapted to be suitably employed in connection with the endoscope of the type which incorporates a light conducting fiber optical system therein for receiving light from a common light source for selective photographing and photo-diagnosing operations as disclosed in the co-pending Japanese patent application No. 42/28,035. Since the details of the construction and arrangement of this type of endoscope have been given in the specification of the above-mentioned Japanese patent application, description of the endoscope itself will be made of only parts which are deemed necessary for understanding the invention.

The automatic exposure control device generally comprises a shutter mechanism including a pair of laterally spaced first and second blades 1 and 5 having a similar sector shape and provided between a condenser 10 and a light conducting fiber optical system 11 which form part of the endoscope and are disposed in alignment with an optical axis 12 extending from a common external light source 9 through the condenser to the light conducting optical system. The first blade 1 is formed with a plurality of apertures 2 therein and fixedly secured at one end to one end of the rotary shaft 3' extending through a rotary solenoid 3 which is in turn positioned between the condenser 10 and light conducting optical system 11 at a point more nearer to the condenser than to the light conducting system and out of the optical axis 12. The first blade 1 is normally positioned on the optical axis 12 in which the endoscope is operated for photo-diagnosing a portion of the interior of a living body requiring a relatively low intensity light as well known in the art and in the above position of the first blade the intensity of a light from the light source 9 is reduced to a predetermined value suitable for the photo-diagnosing by passing through one of the plurality of apertures 2 in the blade. Therefore, the first blade 1 may be termed as a photo-diagnosing light passing plate member. The second blade 5 is formed with a single larger hole 6 and similarly fixedly secured at one end to one end of the rotary shaft 7' extending through a rotary solenoid 7 which is in turn positioned between the condenser 10 and light conducting fiber optical system 11 at a point laterally spaced from the solenoid 3 nearer to the light conducting system than to the condenser in substantial alignment with the first-mentioned rotary solenoid 3. The second blade 5 is normally positioned on the optical axis 12 in which the endoscope is operated for photographing a portion of the interior of a living body requiring a high intensity light and in the above position of the second blade a high intensity light from the light source 9 may pass through the hole 6 in the blade 5 while the first blade 1 being held out of the optical axis 12 so that the passing light may not be obstructed by the first blade. Therefore, the second blade 5 may be termed as a photographing light passing plate member. The first blade 1 is adapted to angularly displace or retreat from away the optical axis 12 upon electromagnetic energization of its associated rotary solenoid 3 in the manner as described hereinafter and the blade is maintained in this retracted position while the endoscope is being operated for photographing. The second blade 5 is adapted to angularly displace upon electromagnetic energization of its associated solenoid 7 so as to dispose the unholed portion thereof in the manner as mentioned hereinafter a predetermined exposure period for photographing thereby to block the passage of a light from the light source 9 to the light conducting optical system 11. After a predetermined exposure period during which the photographing operation is performed, the second blade 5 is positioned to shield the light ray with the unholed portion of the blade disposed on the optical axis 12. Thus, it will be understood that the displacement of the two blades 1 and 5 from their respectively normal position to the angularly displaced position and vice versa may be performed by electromagnetically rotating their respectively associated rotary solenoids 3 and 7 as controlled by electric components of an electric control circuit which includes the solenoids as parts thereof and is electrically connected to the automatic exposure control device as will be described hereinafter. The first and second blades 1 and 5 are made of similar sector-shaped sheet metal.

Figure 5:
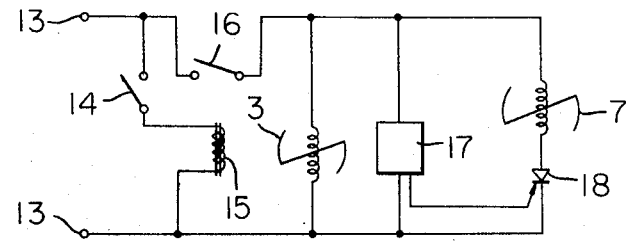
FIG. 5 is a diagram for a preferred form of electric control circuit to be suitably employed in connection with said shutter mechanism for operating the same.

Reference will be now made on FIG. 5 in which a preferred form of electric control circuit is illustrated and the circuit is adapted to control the exposure control device comprising the shutter mechanism so as to effect exposure for a predetermined period of time including the above-mentioned first and second blades 1 and 5. In addition to the above-mentioned first and second blade rotary solenoids 3 and 7 and associated rotary shafts (these shafts are not shown in FIG. 5), the electric control circuit further comprises a D.C. power source terminal 13; a synchronization contact 14 or a contact adapted to be closed in synchronism with the operation of the endoscope for a photograph taking; a relay 15; a relay contact 16; a timing circuit 17 including a photoelectric element; and a control means 18 for the second blade 5 and the control circuit is electrically connected to the automatic exposure control device.

Figure 2:
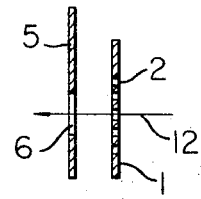
FIGS. 2 to 4 inclusive are views showing the blades of said shutter mechanism in different operative positions, respectively.
Figure 3:
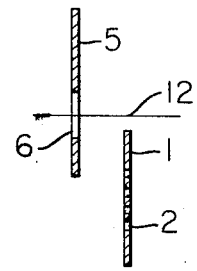
Figure 4:
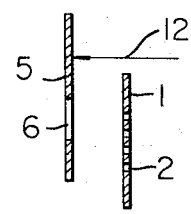

The operation of the novel automatic exposure control device will be now described. Assuming that the control device is now set in the position in which the endoscope is ready for photo-diagnosing a selected portion of the interior of a living body and the first and second blades 1 and 5 assume the position as shown in FIG. 2. In the position of these blades 1 and 5 of FIG. 2, a light from the light source 9 is allowed to pass through the apertures 2 in the first blade 1 and the hole 6 in the second blade 5 along the optical axis 12 while the intensity or quantity of the light being reduced to a value suitable for photo-diagnosing by the first blade apertures 2. When the endoscope is energized for a photographing operation in the conventional manner requiring a high intensity or quantity light, the synchronization contact 14 is simultaneously brought into contact to the associated contact point thereby to energize the relay 15 which in turn closes the relay contact 16. The closure of the relay contact 16 energizes the rotary solenoid 3 to cause the same to rotate by a predetermined angular distance thereby to cause the first blade 1 fixedly secured to the shaft 3' which is secured to the solenoid 3 to rotate by the same angular distance away from the optical axis 12 to the position of the first blade as shown in FIG. 3 in which the high intensity or quantity light from the light source 9 may be allowed to directly pass through the hole 6 in the second blade 5 along the optical axis 12 without being reduced whereby the endoscope is ready for taking a photograph of a desired portion of the interior of a living body with a predetermined degree of exposure. As soon as the endoscope assumes the photographing operation position, current is allowed to pass through the timing circuit 17 to energize the timing circuit at the sensitivity of the photoelectric element included in the timing circuit 17. After a predetermined time period of the energization of the timing circuit 17 to allow a predetermined degree of exposure, the timing circuit generates a pulse to trigger the second blade control means 18 which in turn energizes the second rotary solenoid 7 to cause the solenoid to rotate a predetermined angular distance thereby to rotate the second blade 5 by the same angular distance to the position as shown in FIG. 4 in which the unholed portion of the second blade 5 is disposed on the optical axis 12 so as to block the passage of the light from the light source 9 to the optical system 11 whereby a cycle of photographing operation of the endoscope is completed. Simultaneously, the solenoid 3 is caused to rotate a predetermined angular distance so as to return the first blade 1 to the position of FIG. 2. It should be understood that even after a cycle of photographing operation has been completed, the endoscope still maintains its exposed state, but since the second blade 5 assumes the light passage blocking position as shown in FIG. 4 at this particular time, the light from the light source 9 is blocked by the unholed portion of the second blade 5 in the position of FIG. 4. Thus, by the time a cycle of a photographing operation has been completed, a predetermined degree of exposure can be obtained. As soon as the completion of a cycle of exposure of the endoscope for photographing, the synchronization contact 14 is opened to return the electric circuit to the state as shown in FIG. 5 thereby to return the first and second blades 1 and 5 to the position as shown in FIG. 2 for photo-diagnosing operation position of the endoscope.

With the use of the above-mentioned novel automatic exposure control device in conjunction with the above-mentioned type endoscope, even if the endoscope is designed to take a photograph by momentary depression of a release button, since the angular movement of the first and second blades 1 and 5 can be positively regulated by their respectively associated solenoids 3 and 7, a proper degree of exposure can be at all times obtained and there will be no trouble in the photographing operation of the endoscope. And even if the endoscope is of a single lens reflex camera, a desired photographing can be promptly performed without the use of any delay circuit. Thus, it can be said that the present invention greatly contributes in improving the art of photo-diagnosis as well as the maneuverability of endoscopes. Therefore, the invention is a great contribution to the medical field and especially to clinical examination.

Although one preferred embodiment of the present invention has been described and illustrated herein, it is to be understood that the same is illustrative in nature and not necessarily limiting upon the scope of the teaching in its broader aspects. Many additional variations within the scope of the appended claims will occur to those skilled in the art.

I claim:

1. In an endoscope having a light conducting fiber optical system and an external light source adapted to selectively photograph and photo-diagnose a selected portion of the interior of a living body by said light, an automatic exposure control device comprising a displaceable photo-diagnosing light passing plate member having a plurality of apertures therein and normally positioned on an optical axis extending between said light source and light conducting fiber optical system for allowing a light from said light source to pass through said apertures to the light conducting optical system by reducing the intensity of the light, an electromagnetic drive means connected to said photo-diagnosing plate, said photo-diagnosing plate member being adapted to retract from said optical axis upon electromagnetic driving thereof; a displaceable photographing plate member having a single larger hole therein and normally positioned on said optical axis for allowing said light from said light source through said larger hole to said light conducting optical system while maintaining the light at a high intensity, an electromagnetic drive means connected to said photographing plate, said photographing plate member being adapted to displace upon electromagnetic driving thereof so as to dispose the unholed portion thereof on said optical axis thereby to block the passage of said light to the light conducting optical system; and a control circuit connected to said electromagnetic drive means and adapted to electromagnetically drive said photo-diagnosing plate member to retract the plate member away from said optical axis so as to allow said light from said light source through said hole to said light conducting optical system for photographing operation and after a predetermined exposure period electro-magnetically drive said photographing light passing plate member so as to dispose said unholed portion of the plate member on said optical axis thereby to terminate the light exposure period and upon the termination of the exposure period return said photo-diagnosing light passing plate member and photographing light passing plate member to their normal positions ready for photo-diagnosing operation.

2. An automatic exposure control device for an endoscope having a light conducting fiber optical system as set forth in claim 1, in which said photo-diagnosing light passing and photographing light passing plate members are shutter blades which are fixedly supported on separate solenoids which form parts of said control circuit.

3. An automatic exposure control device for an endoscope having a light conducting fiber optical system as set forth in claim 1, wherein said control circuit includes a timing circuit for energizing said electromagnetic drive means connected to said photographing plate.